United States Patent
Valine et al.

(10) Patent No.: US 10,235,081 B2
(45) Date of Patent: Mar. 19, 2019

(54) PROVISIONING TIMESTAMP-BASED STORAGE UNITS FOR TIME SERIES DATA

(71) Applicant: salesforce.com, inc., San Francisco, CA (US)

(72) Inventors: Thomas Nicholas Valine, San Jose, CA (US); Bhinav Sura, San Mateo, CA (US); Kirankumar Kakanuru Gowdru, Sunnyvale, CA (US); Dilip Devaraj, Colma, CA (US); Rajavardhan Sarkapally, San Francisco, CA (US)

(73) Assignee: salesforce.com, inc, San Francisco, CA (US)

( * ) Notice: Subject to any disclaimer, the term of this patent is extended or adjusted under 35 U.S.C. 154(b) by 477 days.

(21) Appl. No.: 15/141,323

(22) Filed: Apr. 28, 2016

(65) Prior Publication Data
US 2017/0315749 A1    Nov. 2, 2017

(51) Int. Cl.
*G06F 17/30* (2006.01)
*G06F 3/06* (2006.01)

(52) U.S. Cl.
CPC .......... *G06F 3/0644* (2013.01); *G06F 3/0604* (2013.01); *G06F 3/0689* (2013.01); *G06F 17/30551* (2013.01); *G06F 17/30584* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/986,251, Apr. 16, 2013.

*Primary Examiner* — Belix M Ortiz Ditren
(74) *Attorney, Agent, or Firm* — Dergosits & Noah LLP; Todd A. Noah

(57) ABSTRACT

Provisioning timestamp-based storage units for time series data is described. A time series database system determines a remaining time period for a first storage unit to reach a storage capacity, the first storage unit storing first data with a first minimum timestamp. The time series database system provisions a second storage unit if the remaining time period for the first storage unit satisfies the provisioning threshold and stores second data with a second minimum timestamp to the second storage unit. The time series database system dispatches a query for third time series data to any storage unit if a time span from a minimum timestamp to a maximum timestamp associated with the storage unit includes at least part of a time range associated with the third time series data. The time series database system responds to the query for the third time series data based on dispatching the query.

20 Claims, 3 Drawing Sheets

(56) References Cited

U.S. PATENT DOCUMENTS

| | | | |
|---|---|---|---|
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven, et al. | |
| 8,316,055 B2 * | 11/2012 | Warner | G06F 3/0605 707/790 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0122022 A1 * | 5/2014 | Chen | H04L 67/12 702/181 |
| 2014/0289332 A1 * | 9/2014 | Frosst | G06Q 50/01 709/204 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |
| 2017/0090777 A1 * | 3/2017 | Horn | G06F 3/0608 |

* cited by examiner

PROVISIONING TIMESTAMP-BASED STORAGE UNITS FOR TIME SERIES DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Time series data is a sequence of data points, typically consisting of successive measurements made over a time interval. Examples of time series data are ocean tides, counts of sunspots, and the daily closing value of the Dow Jones Industrial Average. Time series data is frequently plotted via line charts. Many domains of applied science and engineering which involve temporal measurements use time series data. Time series data analysis comprises methods for analyzing time series data in order to extract meaningful statistics and other characteristics of the data. Time series data forecasting is the use of a model to predict future values based on previously observed values. A time series database is a computer system that is optimized for handling time series data. In some fields, time series data is called a profile, a curve, or a trace. Despite the disparate names, many of the same mathematical operations, queries, or database transactions are useful for analyzing each of these time series data types. The implementation of a computerized database system that can correctly, reliably, and efficiently implement these operations must be specialized for time series data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
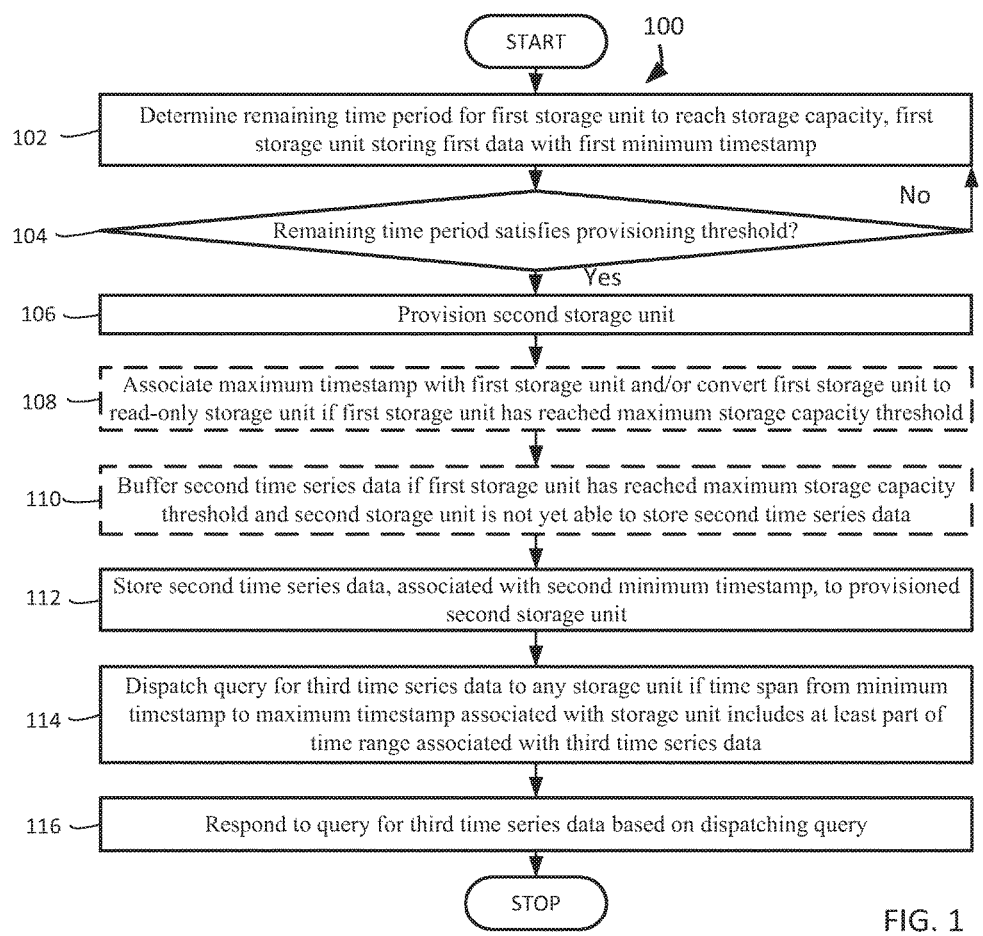
FIG. 1 is an operational flow diagram illustrating a high level overview of a method for provisioning timestamp-based storage units for time series data, in an embodiment.

A software system may be monitored to determine the state of the software system at any given time. This monitoring may include the collection of key performance metrics at a regular cadence to construct a time series of data points that represent a performance metric over a time period. For a distributed software system consisting of many distinct computers, key performance metrics may be collected from each computer and stored as separate time series data points on a computer-by-computer basis. Once collected into a storage mechanism, these key performance metrics can be transformed to gain an overall view of each performance metric at a distributed system level.

In an attempt to keep the query latency of time series data repositories to a minimum, a common technique is to maintain multiple discrete time series data repositories, where each time series data repository is dedicated to a subset of time series data based on some part of the time series data schema, such as the name, or datacenter, or cluster. However, this technique does not sufficiently account for the temporal adjacency of the time series data. For example, a time series data point named CPU utilization is dedicated to a time series data repository based on the name CPU utilization, such that the CPU utilization time series data point from every time period is stored in that time series data repository, whether the time series data point is 10 years old or 10 minutes old. Since this time series data repository has no policy about the timeliness of the time series data, and most time series storage databases use the time as part of the primary key for retrieving requested time series data points, queries have to span many keys in order to find the requested time series data points, thereby resulting in long query latency.

Another challenge for a time series data repository based on some part of the time series data schema is that new telemetry is frequently added and removed from monitoring systems, and the time series data schema element changes frequently. For example, a time series data repository is initially created to store time series data points that have names starting with the letters "a," "b," "c," and "d," and this time series data repository can handle 1 million time series data points a second. However, as the volume of stored time series data points increases over time, the time series data repository no longer has the storage capacity to store time series data points that have names starting with even one of the letters "a," "b," "c," or "d," making it difficult to manage.

Some existing time series database systems may dedicate a single time series data repository to a specific time range, such as the trailing month worth of data. However, as time series data expires out of the specified time range, this expired time series data must be migrated to another time series data repository that represents older data. This migration of time series data is wasteful because this migration requires the unnecessary copying and re-storing of time series data, which creates additional possibilities for failure.

In accordance with embodiments described herein, there are provided methods and systems for provisioning timestamp-based storage units for time series data. As used herein, provisioning refers to the enterprise-wide preparation, configuration, deployment, activation and/or management of timestamp-based storage units. Provisioning can be performed manually or automatically through the use of auto-provisioning programs. A time series database system determines a remaining time period for a first storage unit to reach a storage capacity, the first storage unit storing first time series data associated with a first minimum timestamp. The time series database system provisions a second storage unit if the remaining time period for the first storage unit satisfies the provisioning threshold. The time series database system stores second time series data, associated with a second minimum timestamp, to the second storage unit. The time series database system dispatches a query for third time series data to any storage unit if a time span from a minimum timestamp to a maximum timestamp associated with the storage unit includes at least part of a time range associated with the third time series data. The time series database system responds to the query for the third time series data based on dispatching the query.

In an extremely simplified example, the time series database system estimates a remaining time of 24 hours for a first storage unit based on the first storage unit, which began storing time series data at 12:00 A.M. on January first, having a remaining storage capacity of 20 terabytes (TB) and a diminishing storage capacity rate of 20 TB per 24 hours at 12:00 A.M. on January $5^{th}$. The time series database system provisions a second storage unit because the remaining time of 24 hours for the first storage unit is less than or equal to a provisioning threshold of 24 hours. The time series database system begins storing time series data at 12:00 A.M. on January $6^{th}$ to the second storage unit. The time series database system dispatches a query for the time series data point CPU utilization to the first storage unit because the first storage unit's time span from 12:00 A.M. on January first to 11:59 P.M. on January $5^{th}$ includes the first six hours of the query's time range from 6:00 P.M. on January $5^{th}$ to 6:00 A.M. on January $6^{th}$. The time series database system dispatches the query to the second storage unit because the second storage unit's time span from 12:00 A.M. on January $6^{th}$ to the current time includes the last six hours of the query's time range from 6:00 P.M. on January $5^{th}$ to 6:00 A.M. on January $6^{th}$. The time series database system responds to the query for the time series data point CPU utilization from 6:00 P.M. on January $5^{th}$ to 6:00 A.M. on January $6^{th}$ based on dispatching the query to the first storage unit and the second storage unit. In this way, within a set of elastic data centers, write traffic can be distributed and allocated to existing capacity and new capacity can be added without having to copy, migrate, or otherwise aggregate the time series data.

Systems and methods are provided for provisioning timestamp-based storage units for time series data. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for provisioning timestamp-based storage units for time series data will be described with reference to example embodiments. The following detailed description will first describe a method for provisioning timestamp-based storage units for time series data.

While one or more implementations and techniques are described with reference to an embodiment in which provisioning timestamp-based storage units for time series data is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 is an operational flow diagram illustrating a high level overview of a method 100 for provisioning timestamp-based storage units for time series data. A time series database system determines a remaining time period for a first storage unit to reach a storage capacity, the first storage unit storing first time series data associated with a first minimum timestamp, block 102. For example and without limitation, this can include the time series database system determining a remaining time period of 24 hours for a first storage unit to reach maximum storage capacity based on the first storage unit, which began storing time series data at 12:00 A.M. on January first, having a remaining storage capacity of 20 TB and a diminishing storage capacity rate of 20 TB per 24 hours at 12:00 A.M. on January $5^{th}$.

Although this example describes the time series database system determining a remaining time period for the first storage unit to reach the maximum storage capacity, the time series database system may determine a remaining time period for the first storage unit to reach some other storage capacity, such as 90% of the first storage unit's maximum storage capacity. Determining when the first storage unit reaches 90% of the first storage unit's maximum storage capacity enables the time series database system to begin provisioning the second storage unit with more remaining storage capacity in the first storage unit, such that an unexpected delay in the provisioning process is less likely to result in a lack of storage capacity to store the time series data points. The time series database system may wait until the remaining storage capacity for the first storage unit reaches a specific threshold, such as 50% of the maximum storage capacity, before determining a remaining time period for the first storage unit to reach a storage capacity, thereby conserving the resources required for unnecessary determinations, such as each occasion when first storage unit still retains more than 50% of the maximum storage capacity.

The first storage unit may include multiple storage devices. For example, the first storage unit with a total storage capacity of 100 TB may be a cluster of 20 storage devices, with a total storage capacity of 5 TB for each of the 20 storage devices. If the first storage unit includes multiple storage devices, the time series database system stores time series data to each of the multiple storage devices without any distinction based on the time series data schema.

The time series database system may provision the first storage unit and each subsequent storage unit based on throughput capacity. For example, if the time series database system requires a throughput capacity of 2 million time series data points per minute, and one storage unit provides the throughput capacity of 1 million time series data points per minute, then the time series database system provisions at least two storage units to provide the required throughput capacity of 2 million time series data points per minute.

Having determined the remaining time period for the first storage unit to reach a storage capacity, the time series database system determines whether the remaining time period for the first storage unit satisfies a provisioning threshold, block 104. By way of example and without limitation, this can include the time series database system determining whether the remaining time period of 24 hours for the first storage unit is less than or equal to the provisioning threshold of 24 hours. The provisioning threshold may be based on a historical provisioning time, a projected provisioning time, and/or a worst case provisioning time. For example, the provisioning threshold of 24 hours may be based on a worst case provisioning time in order to avoid being unable to write the time series data to a storage unit, even though the historical average of the time required to provision another storage unit has been 8 hours.

If the remaining time period for the first storage unit satisfies the provisioning threshold, the method 100 continues to block 106 to provision another storage unit. If the remaining time period for the first storage unit does not satisfy the provisioning threshold, the method 100 returns to block 102 to determine another remaining time for the first storage unit.

Since the remaining time period for the first storage unit satisfies the provisioning threshold, the time series database system provisions a second storage unit, block 106. In embodiments, this can include the time series database system provisioning a second storage unit, with a 100 TB capacity, because the remaining time period of 24 hours for the first storage unit is less than or equal to the provisioning threshold of 24 hours. Although this example describes the time series database system provisioning one second storage unit for one first storage unit that is running out of storage capacity, if the diminishing storage capacity rate for the first storage unit increase to a rate beyond which a one-to-one provisioning of an additional storage unit would not be sufficient, then the time series database system may provision multiple storage units for the one first storage unit that is running out of storage capacity.

The time series database system provisioning the second storage unit includes the possibilities of both automated provisioning and manual provisioning. For example, the time series database system may automatically provision the second storage unit in 3 hours without requiring any human intervention, or the time series database system may send a request for the human intervention required to provision the second storage unit within 24 hours.

The second storage unit may include multiple storage devices. For example, the second storage unit with a total storage capacity of 100 TB may be a cluster of 20 storage devices, with a total storage capacity of 5 TB for each of the 20 storage devices. If the second storage unit includes multiple storage devices, the time series database system stores time series data to each of the multiple storage devices without any distinction based on the time series data schema.

After determining that the remaining time period for the first storage unit satisfies the provisioning threshold, the time series database system optionally associates a maximum timestamp with the first storage unit and/or converts the first storage unit to a read-only storage unit if the first storage unit has reached a maximum storage capacity threshold, block 108. For example and without limitation, this can include the time series database system assigning the maximum timestamp of 11:59 P.M. on January $5^{th}$ to the first storage unit when the first storage unit has reached the maximum storage capacity threshold at 11:59 P.M. on January $5^{th}$. In another example, the time series database system converts the first storage unit to a read-only storage unit when the first storage unit has reaches a maximum storage capacity threshold at 11:59 P.M. on January $5^{th}$.

The maximum timestamp associated with the first storage unit may be greater than the second minimum timestamp associated with the second storage unit. For example, the time series database system sends time series data to both the second storage unit and to the first storage unit when the second storage unit is fully provisioned at 12:00 A.M. on January $6^{th}$ because the first storage unit still has some remaining storage capacity at 12:00 A.M. on January $6^{th}$, which results in these storage units storing time series data with overlapping time spans. The time series database system may be able to send time series data more efficiently to two storage units than sending time series data to only one storage unit, and using all of the first storage unit's storage capacity may be more efficient than allowing any of the first storage unit's storage capacity to go unused.

Having determined that the remaining time period for the first storage unit satisfies the provisioning threshold, the time series database system optionally buffers second time series data if the first storage unit has reached a maximum storage capacity threshold and the second storage unit is not yet able to store the second time series data, block 110. By way of example and without limitation, this can include the time series database system sending time series data to a system buffer when the first storage unit has reached a maximum storage capacity threshold at 11:59 P.M. on January $5^{th}$, and the second storage unit is not ready yet to store time series data.

After provisioning the second storage unit, the time series database system stores second time series data, associated with a second minimum timestamp, to the second storage unit, block 112. In embodiments, this can include the time series database system storing time series data, beginning at 12:00 A.M. on January $6^{th}$, to the second storage unit. Although these examples describe a general sequence in which the first storage unit reaches its maximum storage capacity before the time series database system stores time series data to the second storage unit, the description for block 108 includes an example in which the time series database system stores time series data to the second storage unit before the first storage unit reaches its maximum storage capacity.

After storing time series data to the second storage unit, the time series database system dispatches a query for third time series data to any storage unit if a time span from a minimum timestamp to a maximum timestamp associated with the storage unit includes at least part of a time range associated with the third time series data, block 114. For example and without limitation, this can include the time series database system dispatching a query for the time series data point CPU utilization to the first storage unit because the first storage unit's time span from 12:00 A.M. on January first to 11:59 P.M. on January $5^{th}$ includes the first six hours of the query's time range from 6:00 P.M. on January $5^{th}$ to 6:00 A.M. on January $6^{th}$. In another example, the time series database system dispatches the query for the time series data point CPU utilization to the second storage unit because the second storage unit's time span from 12:00 A.M. on January $6^{th}$ to the current time includes the last six hours of the query's time range from 6:00 P.M. on January $5^{th}$ to 6:00 A.M. on January $6^{th}$.

Since each storage unit represents time series data within a fixed range of timestamps at any given point of time, the time series database system can fork and dispatch a query only to the storage units which contain time series data for the query's time range. Even if multiple storage units represent overlapping time spans, the total number of storage units that the time series database system needs to access may be significantly less than the complete set of all storage units if the query's time range is quite small compared to the overall time span represented by the complete set of all storage units.

Having dispatched the query, the time series database system responds to the query for the third time series data based on dispatching the query, block 116. By way of example and without limitation, this can include the time series database system responding to the query for the time series data point CPU utilization from 6:00 P.M. on January $5^{th}$ to 6:00 A.M. on January $6^{th}$ based on dispatching the query to the first storage unit and the second storage unit.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

A key property of time series data is that telemetry that is emitted by devices at any given time is temporally adjacent. That is, the stream of incoming telemetry to the time series database system is temporally contiguous. This property results in timestamp-based storage units generally containing short contiguous time ranges resulting in a time series database system that generally contains timestamp-based storage units or small groups of timestamp-based storage units that represent distinct time periods. For historical queries, the likelihood that only the timestamp-based storage units containing the requested time series data will be read is very high, which is an optimization.

The examples describing a time series database system that contains only two timestamp-based storage units are extremely simplified, such that an example with a larger number of timestamp-based storage units more clearly describes the optimization of queries. Projecting the previous example for a full year, the first storage unit stores time series data with the timestamps January $1^{st}$ to January $5^{th}$, the second storage unit stores time series data with the timestamps January $6^{th}$ to January $10^{th}$, . . . the $90^{th}$ storage unit stores time series data with the timestamps December $22^{nd}$ to December $26^{th}$, and the $91^{st}$ storage unit stores time series data with the timestamps December $27^{th}$ to December $31^{st}$. This time series database system responds to the query for the time series data point CPU utilization from 6:00 P.M. on January $5^{th}$ to 6:00 A.M. on January $6^{th}$ by accessing only the first and second storage units out of the 91 storage units, or roughly 2.2% of the total search space, quickly accessing these storage units that store read-only time series data. The percentage of total search space accessed would be even smaller in a production time series database system, which typically stores multiple years of time series data.

Furthermore, after this time series database system stores the time series data to the first and second storage units, this time series database system never needs to migrate this time series data. In contrast, as the volume of stored time series data increased over the year for time series data repositories based on the name of the time series data, the time series data repository storing the time series data point CPU utilization may no longer has the storage capacity to store time series data points that have names starting with the letter "c," making subsequent storage of the time series data point CPU utilization difficult to manage. Additionally, the January time series data points for CPU utilization would have expired out of a time series data repository that stores the last month's time series data, such that this expired time series data must have been migrated to another time series data repository that represents older data. This migration of time series data is wasteful because this migration requires the unnecessary copying and re-storing of time series data, which creates additional possibilities for failure.

Additionally, timestamp-based storage units optimizes the available storage capacity of these storage units by storing time series data in each storage unit until the storage unit reaches its maximum storage capacity, and then simply stores the next time series data to a newly provisioned storage unit. In contrast, a previous time series data repository that stores the last month's time series data always has to leave part of the data repository unused and available for storing the next day's time series data until the expired time series data can be migrated to another time series data repository that represents older data stores. In another contrast, a time series data repository storing time series data points that have names starting with the letter "c" always has to leave part of the data repository unused and available for storing subsequent storing time series data points that have names starting with the letter "c."

System Overview

Figure 2:
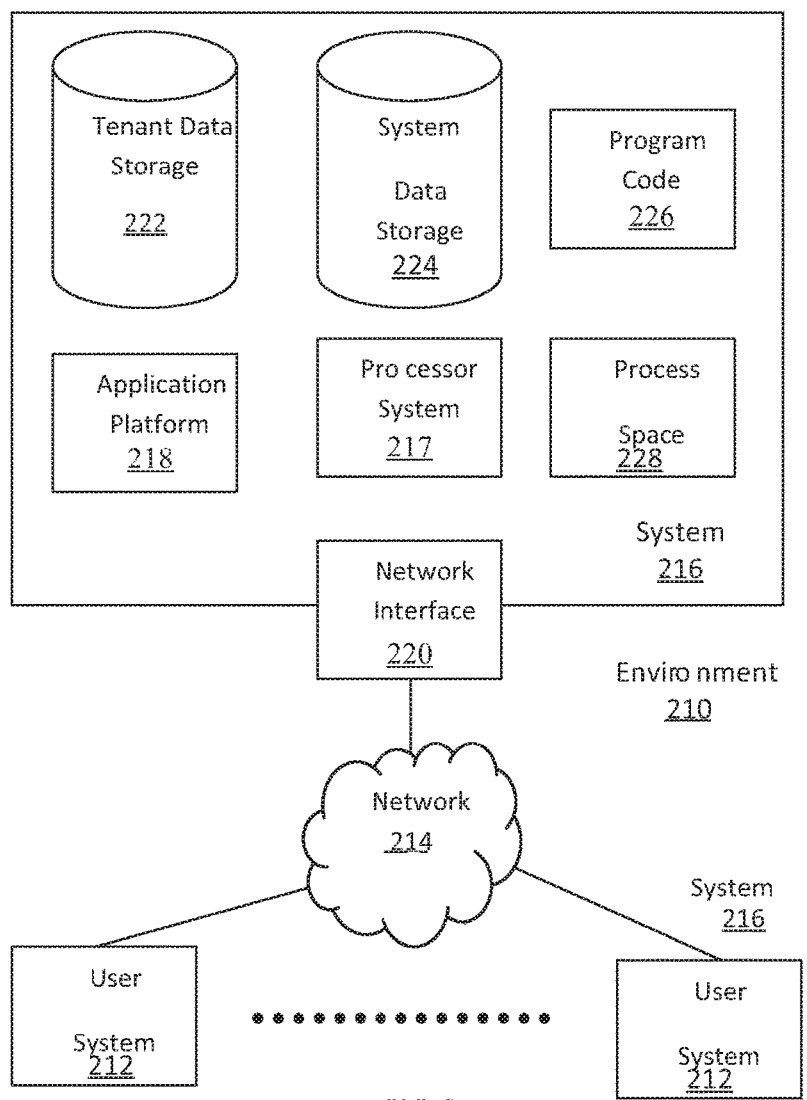
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
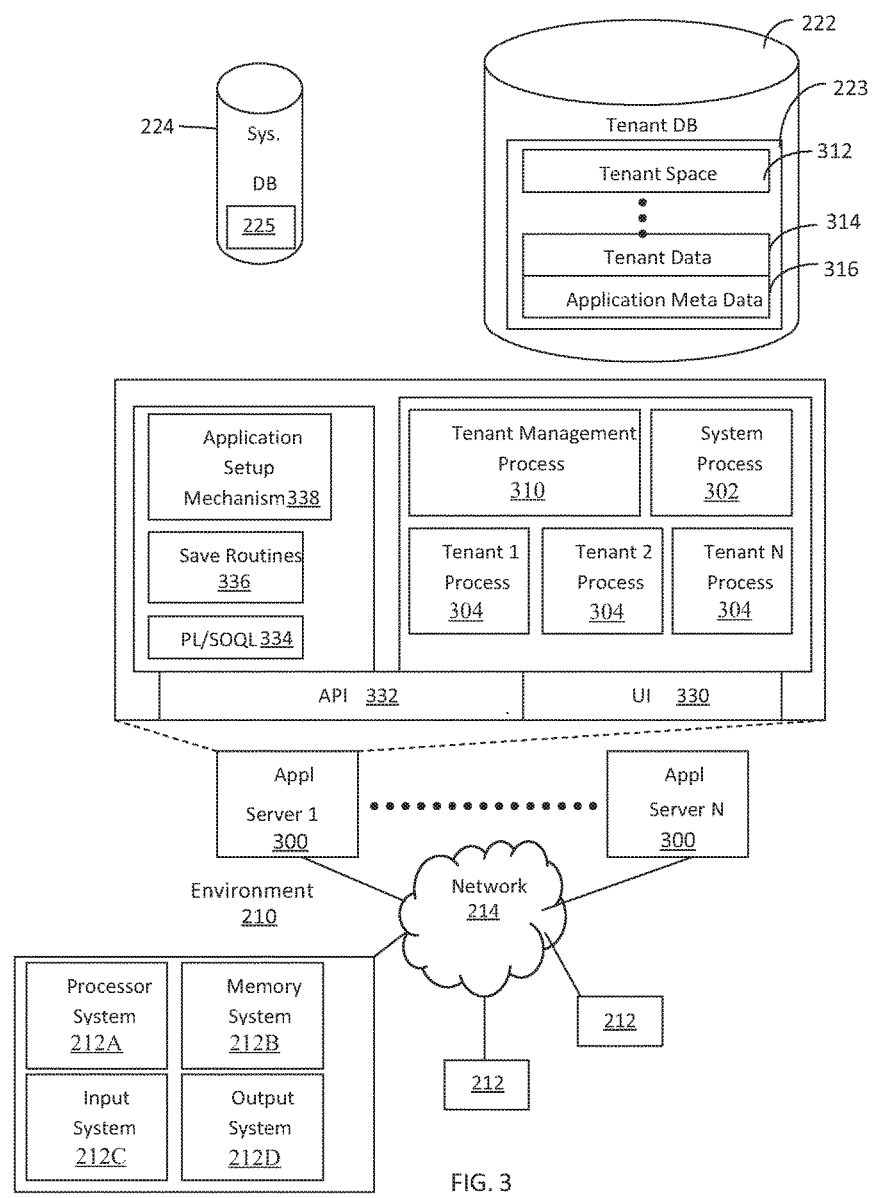
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in reference to FIG. 2. Regarding the user systems 212, the processor system 212A may be any combination of one or more processors. The memory system 212B may be any combination of one or more memory devices, short term, and/or long term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for provisioning timestamp-based storage units for time series data, the system comprising:
   one or more processors; and
   a non-transitory computer readable medium storing a plurality of instructions, which when executed, cause the one or more processors to:
      determine, by a time series database system, a remaining time period for a first storage unit to reach a storage capacity and whether the remaining time period satisfies a provisioning threshold, the first storage unit storing first time series data associated with a first minimum timestamp;
      provision, by the time series database system, a second storage unit in response to a determination that the remaining time period for the first storage unit satisfies the provisioning threshold;
      store, by the time series database system, second time series data to the provisioned second storage unit, the second time series data being associated with a second minimum timestamp;
      dispatch, by the time series database system, a query for third time series data to any storage unit in response to a determination that a time span from a minimum timestamp to a maximum timestamp associated with the storage unit comprises at least part of a time range associated with the third time series data; and
      respond, by the time series database system, to the query for the third time series data based on dispatching the query.

2. The system of claim 1, wherein determining the remaining time period is based on a remaining storage capacity and a diminishing storage capacity rate for the first storage unit.

3. The system of claim 1, wherein the provisioning threshold is based on at least one of a historical provisioning time, a projected provisioning time, and a worst case provisioning time.

4. The system of claim 1, wherein at least one of the first storage unit and the second storage unit comprises a corresponding plurality of storage devices.

5. The system of claim 1, comprising further instructions, which when executed, cause the one or more processors to associate a maximum timestamp with the first storage unit in response to a determination that the first storage unit has reached a maximum storage capacity threshold.

6. The system of claim 1, comprising further instructions, which when executed, cause the one or more processors to convert the first storage unit to a read-only storage unit in response to a determination that the first storage unit has reached a maximum storage capacity threshold.

7. The system of claim 5, wherein the maximum timestamp associated with the first storage unit is greater than the second minimum timestamp associated with the second storage unit.

8. A computer program product comprising computer-readable program code to be executed by one or more processors when retrieved from a non-transitory computer-readable medium, the program code including instructions to:
   determine, by a time series database system, a remaining time period for a first storage unit to reach a storage capacity and whether the remaining time period satisfies a provisioning threshold, the first storage unit storing first time series data associated with a first minimum timestamp;
   provision, by the time series database system, a second storage unit in response to a determination that the remaining time period for the first storage unit satisfies the provisioning threshold;
   store, by the time series database system, second time series data to the provisioned second storage unit, the second time series data being associated with a second minimum timestamp;
   dispatch, by the time series database system, a query for third time series data to any storage unit in response to a determination that a time span from a minimum timestamp to a maximum timestamp associated with the storage unit comprises at least part of a time range associated with the third time series data; and
   respond, by the time series database system, to the query for the third time series data based on dispatching the query.

9. The method of claim 8, wherein determining the remaining time period is based on a remaining storage capacity and a diminishing storage capacity rate for the first storage unit.

10. The computer program product of claim 8, wherein the provisioning threshold is based on at least one of a historical provisioning time, a projected provisioning time, and a worst case provisioning time.

11. The computer program product of claim 8, wherein at least one of the first storage unit and the second storage unit comprises a corresponding plurality of storage devices.

12. The computer program product of claim 8, wherein the program code comprises further instructions to associate a maximum timestamp with the first storage unit in response to a determination that the first storage unit has reached a maximum storage capacity threshold, wherein the maximum timestamp associated with the first storage unit is greater than the second minimum timestamp associated with the second storage unit.

13. The computer program product of claim 8, wherein the program code comprises further instructions to convert the first storage unit to a read-only storage unit in response to a determination that the first storage unit has reached a maximum storage capacity threshold, wherein the maximum timestamp associated with the first storage unit is greater than the second minimum timestamp associated with the second storage unit.

14. A method for provisioning timestamp-based storage units for time series data, the method comprising:
   determining, by a time series database system, a remaining time period for a first storage unit to reach a storage capacity and whether the remaining time period satisfies a provisioning threshold, the first storage unit storing first time series data associated with a first minimum timestamp;
   provisioning, by the time series database system, a second storage unit in response to a determination that the remaining time period for the first storage unit satisfies the provisioning threshold;
   storing, by the time series database system, second time series data to the provisioned second storage unit, the second time series data being associated with a second minimum timestamp;
   dispatching, by the time series database system, a query for third time series data to any storage unit in response to a determination that a time span from a minimum timestamp to a maximum timestamp associated with the storage unit comprises at least part of a time range associated with the third time series data; and responding, by the time series database system, to the query for the third time series data based on dispatching the query.

15. The method of claim 14, wherein determining the remaining time period is based on a remaining storage capacity and a diminishing storage capacity rate for the first storage unit.

16. The method of claim 14, wherein the provisioning threshold is based on at least one of a historical provisioning time, a projected provisioning time, and a worst case provisioning time.

17. The method of claim 14, wherein at least one of the first storage unit and the second storage unit comprises a corresponding plurality of storage devices.

18. The method of claim 14, wherein the method further comprises associating a maximum timestamp with the first storage unit in response to a determination that the first storage unit has reached a maximum storage capacity threshold.

19. The method of claim 14, wherein the method further comprises converting the first storage unit to a read-only storage unit in response to a determination that the first storage unit has reached a maximum storage capacity threshold.

20. The method of claim 18, wherein the maximum timestamp associated with the first storage unit is greater than the second minimum timestamp associated with the second storage unit.

\* \* \* \* \*